(No Model.)
C. H. WARRINGTON.
PLOW ATTACHMENT.
No. 482,602. Patented Sept. 13, 1892.
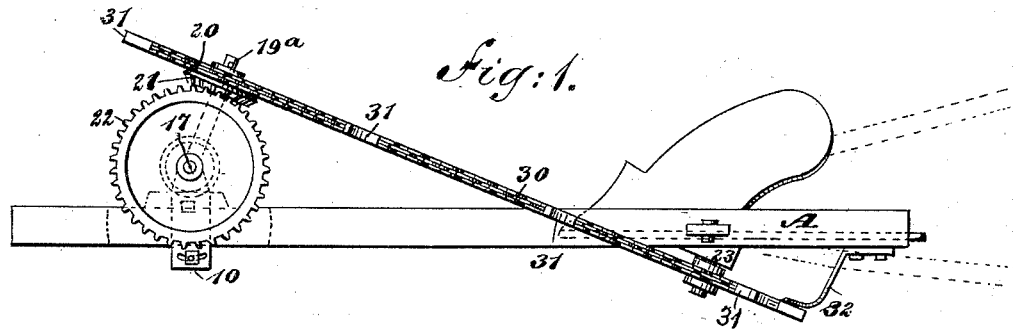
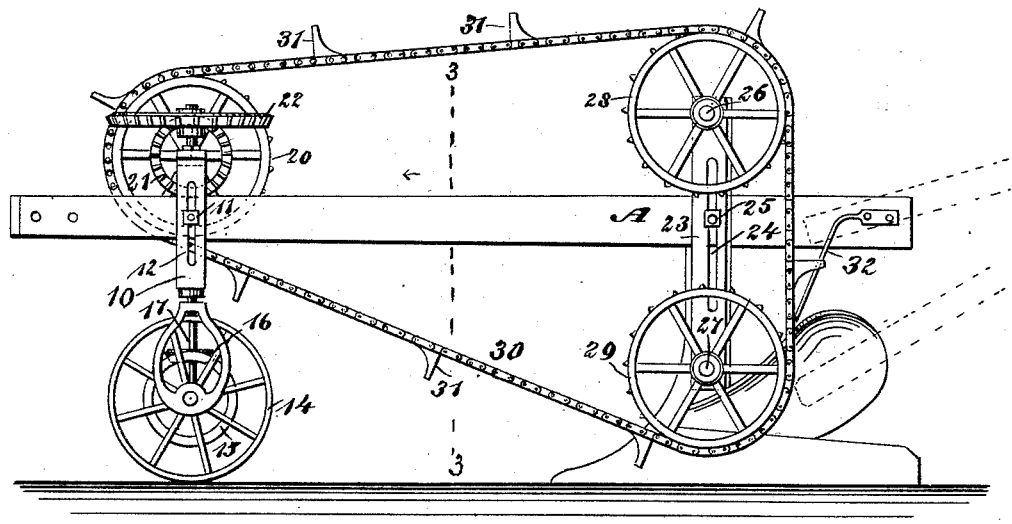
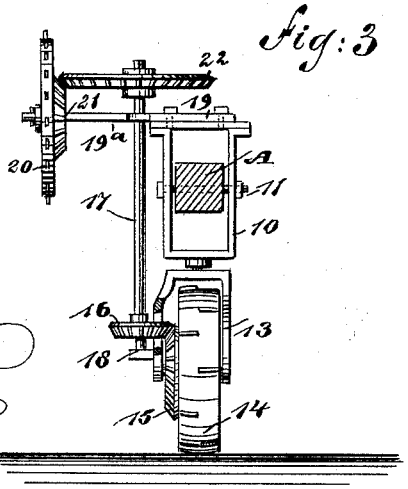
WITNESSES:
Chas. Nida
C. Sedgwick
INVENTOR
C. H. Warrington
BY
Munn & Co
ATTORNEYS.

UNITED STATES PATENT OFFICE.

CURTIS H. WARRINGTON, OF WEST CHESTER, PENNSYLVANIA.

PLOW ATTACHMENT.

SPECIFICATION forming part of Letters Patent No. 482,602, dated September 13, 1892.

Application filed June 28, 1892. Serial No. 438,261. (No model.)

*To all whom it may concern:*

Be it known that I, CURTIS H. WARRINGTON, of West Chester, in the county of Chester and State of Pennsylvania, have invented a new and Improved Plow Attachment, of which the following is a full, clear, and exact description.

The invention relates to an attachment for plows and is especially adapted for preventing the share and mold-board from becoming clogged with weeds or with rubbish of any description in the path of the share and to so construct the attachment that it will be simple, durable, and economic and capable of application to any plow, whether right-hand or left-hand, and also to provide a means whereby the weeds, trash, or rubbish when cleared from the plow or mold-board will be delivered at the rear of the share into the furrow in such a manner that the delivered material may be turned under and thoroughly covered as the plow advances.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of a right-hand plow having the improvement applied thereto. Fig. 2 is a side elevation of the plow and its attachment; and Fig. 3 is a transverse section taken, practically, on the line 3 3 of Fig. 2.

When the ground is covered with weeds, long straw, manure, or trash of any kind and it is undertaken to plow it when in that condition, the trash backs up between the beam of the plow and the ground immediately where the mold-board cuts the furrow, and therefore it is necessary to stop the team very often to clean the trash away, thus rendering the work of plowing needlessly tiresome and causing the operator to lose considerable time, as if the trash is not cleaned out of the way it will eventually ride the plow out of the ground.
It is the prime object of this invention to provide an attachment to a plow which will act constantly while the plow is in operation to clean the trash from the front of the plow and carry it toward a furrow, depositing the trash therein and causing it to be thoroughly covered.

In carrying out the invention I have illustrated it and will describe it as applied to a right-hand plow, as by simply reversing the position of its parts it is capable of use upon a left-hand plow. Near the front of the plow-beam A a yoke-like frame 10 is located, through which frame the plow-beam passes. The yoke-frame 10 is adjustably attached to the plow-beam through the medium of a bolt 11, which passes through the beam and through longitudinal slots 12, made in the side members of the yoke, as the yoke is adapted to be raised or lowered according to the depth it is desired to plow. The yoke at its lower end is pivotally attached to a housing 13 of a wheel 14, and this wheel, as shown in Fig. 3, is preferably roughened upon its periphery, being ordinarily provided with traction-ribs of any approved construction. The wheel at one side has attached to its spindle or axle or has attached to its hub or side face a bevel-gear 15, and this gear meshes with a bevel-pinion 16, fast upon the lower end of the vertical shaft 17, the lower end of which shaft is held to revolve in a bracket 18, projected from the housing of the wheel 14, and the upper end of the shaft is passed through a suitable opening produced in a guide-bar 19, said bar being secured to the upper portion of the yoke 10. The bar extends beyond the side of the yoke at which the vertical shaft 17 is located, and the major portion of the projecting end of the bar is round, forming a shaft 19ª, as shown in Fig. 3. Upon the outer extremity of this shaft 19ª a sprocket-wheel 20 is loosely mounted, and this sprocket-wheel has formed upon its inner face a bevel-pinion 21, or the pinion may be attached to the sprocket-wheel, the said pinion being adapted to mesh with a horizontally-located bevel-gear 22, attached at the upper end of the vertical shaft 17.

Upon the landside portion of the beam A a plate 23 is vertically and adjustably located. This plate may be more properly termed a

"supporting-bar," as, as is shown in Fig. 1, it is somewhat wedge shape or triangular in cross-section, and it is so formed in order that the outer face of the bar when its inner face is engaged with the beam A will be given an inclined position, the inclination of the outer face being such that it will stand at more or less of an obtuse angle to the side of the beam.

The adjustment is effected by forming a slot 24 in the supporting-bar 23 longitudinally thereof and passing a bolt 25 through the slot and into the beam, the bolt being provided with a suitable lock-nut. The supporting-bar extends some distance downward below the beam, as well as upward beyond it, and at the upper end of the bar a short shaft 26 is outwardly and horizontally projected, while a similar shaft 27 is located in like manner at the lower end of the supporting-bar. The upper shaft carries a sprocket-wheel 28 and the lower shaft a like wheel 29. An endless chain belt 30 is passed over the sprocket-wheels 28 and 29 and over the forward sprocket-wheel 20, and as the sprocket-wheels are located at opposite sides of the plow-beam the endless chain belt is passed diagonally across the beam, the upper portion of the belt passing over the upper portion of the beam and the lower portion of the belt beneath the lower portion of the beam. The endless belt has attached thereto a series of carriers 31. These carriers are made, preferably, in the style of a bucket, are somewhat triangular in general contour, and are secured to the outer faces of the chain belt at their base portions in such a way that the side adapted to face the rear carriers as taken along the downward stretch of the belt will be straight and will stand at a right angle to the belt, as shown in Fig. 2. Upon the left-hand side of the beam, at its rear, a finger 32 is located, which may be made of spring metal, and it is curved downward in such manner that it will engage with the side surfaces of the carriers 31 as they are carried vertically downward at the back of the plow, and the object of the finger 32 is to strip from the carriers any trash that may adhere thereto when the carriers are upon their downward stretch, as the burden of the trash is removed from the plow and delivered under the beam in a manner to be turned under by the plow.

It is evident that in the operation of this attachment as the plow is advanced any trash that may be in the path of its share will be taken upward from in front of the share by the carriers and delivered into the furrow at the rear of the plow, where it will be covered up by the overturning earth, and if any trash should cling to the carriers as they ascend in direction of the beam the finger 32 will effectually relieve the carriers from matter clinging to them and will direct all such matter into the furrow in the manner above described.

Having thus described my invention, I claim as new and desire to secure by Letters Patent—

1. The combination, with a plow-beam, a supporting and driving wheel carried by the beam, a chain-pulley located above the supporting and driving wheel, and a driving connection between the chain-pulley and the driving and supporting wheel, of chain-pulleys located at the opposite side of the beam near its rear, one above and the other below it, and an endless chain belt passing over the chain-pulleys diagonally across the beam, the said belt being provided with carriers, as and for the purpose specified.

2. The combination, with a plow-beam, an adjustable yoke attached to the forward portion of the beam, and a combined driving and supporting wheel carried by the yoke, of a sprocket-wheel journaled at one side of the beam, a driving connection between the sprocket-wheel and the combined driving and supporting wheel, sprocket-wheels adjustably located near the end of the beam upon the opposite side of the forward sprocket-wheel, one of the rear wheels being located above and the other below the beam, an endless chain belt passing diagonally both above and below the beam and over the sprocket-wheels, carriers attached to the outer faces of the belt, and a finger secured to the beam and adapted for engagement with the carriers, as and for the purpose set forth.

3. The combination, with a plow-beam, a combined driving and supporting wheel adjustably attached to the forward portion of the beam, a sprocket-wheel located upon the mold-board side of the share at the top of the beam, and a driving connection between the beam and the sprocket-wheel and supporting and driving wheel, of a supporting-bar adjustably attached to the opposite or landside portion of the plow-beam near its rear, the said supporting-bar being somewhat wedge-shaped or triangular in cross-section, sprocket-wheels journaled upon the supporting-bar, one at the top and the other at the bottom, the upper wheel being at the bottom and the lower wheel opposite the landside of the share, an endless belt passed over the sprocket-wheels and extending diagonally across the top and bottom of the beam, carriers located upon the belt, and a stripping mechanism secured to the beam and adapted for engagement with the carriers, as and for the purpose specified.

CURTIS H. WARRINGTON.

Witnesses:
T. FRANCIS WARRINGTON,
JENNIE P. HOFFMAN.